(12) United States Patent
Goosey, Jr.

(10) Patent No.: US 6,377,404 B1
(45) Date of Patent: Apr. 23, 2002

(54) REVERSE TELEPHOTO ZOOM LENS

(75) Inventor: William T. Goosey, Jr., Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/488,114

(22) Filed: Jan. 20, 2000

(51) Int. Cl.⁷ .............................................. G02B 15/14
(52) U.S. Cl. ...................................... 359/682; 359/691
(58) Field of Search .............................. 359/691, 692, 359/680–682

(56) References Cited

U.S. PATENT DOCUMENTS

| | | | |
|---|---|---|---|
| 4,155,629 A | 5/1979 | Nakamura | 359/691 |
| 4,299,452 A | 11/1981 | Ikemori | 359/691 |
| 4,304,466 A * | 12/1981 | Betensky | 359/691 |
| 4,999,007 A | 3/1991 | Aoki et al. | 359/691 |
| 5,552,937 A | 9/1996 | Ono et al. | 359/691 |
| 5,563,739 A | 10/1996 | Sato | 359/691 |
| 5,875,060 A * | 2/1999 | Umeda | 359/691 |
| 6,154,322 A * | 11/2000 | Nakayama | 359/691 |

* cited by examiner

*Primary Examiner*—Scott J. Sugarman
(74) *Attorney, Agent, or Firm*—William J. Greener

(57) ABSTRACT

A reverse telephoto zoom lens particularly suitable for use in a compact digital camera preferably has two moving lens groups in which either the first lens group has a lens component having both positive and negative power in respective radial zones of the lens or the second lens group has a lens component closer to the image plane than any other lens component and this lens component has a concave surface facing the image plane, or both. The zoom lens delivers near telecentric performance and exhibits non-reversing motion of either lens group in going between a telephoto position and a wide angle position, and vice-versa.

18 Claims, 13 Drawing Sheets

ON-AXIS

.7 FIELD

FULL FIELD

ON-AXIS

.7 FIELD

FULL FIELD

ON-AXIS

.7 FIELD

FULL FIELD

REVERSE TELEPHOTO ZOOM LENS

FIELD OF THE INVENTION

The invention relates generally to a zoom lens and more particularly to a reverse telephoto zoom lens suitable for use in a compact digital camera.

BACKGROUND OF THE INVENTION

Compact, inexpensive cameras and recently, digital cameras, are currently very popular among consumers. One of the more desirable features of these cameras is a zoom lens. This has challenged lens and camera designers to develop more compact zoom lenses that are camera compatible in terms of camera size and mechanical simplicity while still providing acceptable imaging quality. Digital cameras present a further challenge. The electronic image capture media typically used in digital cameras, such as CMOS or CCD arrays, often employ microlenslet arrays to enhance light collection by the pixels and to suppress aliasing. To work effectively, however, the lens system directing the light to these arrays should ideally be telecentric or nearly so because the effectiveness of the arrays is a function of the angle of incidence of the incoming bundle of light. By telecentric, it is meant that the light impinging the microlenslet array is substantially parallel to the optical axis and strikes the array at a very shallow impingement angle.

Three-moving-group zoom lenses and afocal zoom lenses with a fixed positive lens group are able to provide a high degree of telecentricity but at the expense of numerous elements including costly aspheric components, loss of compactness, and complicated mechanical zoom drive systems.

Historically, two-group (negative, positive) zooming retrofocus or reverse telephoto lens systems were used in 35 mm SLR cameras. In spite of their bulkiness, they provided the long back focal lengths necessary to accommodate the movable mirror in the SLR camera design. This same bulkiness attribute, however, detracted from consideration of this type of lens system for use in compact digital cameras. Nevertheless, the comparatively smaller format of a digital camera CCD compared to the 35 mm film format enables the use of such a properly designed lens system, such as that set forth herein, in a compact digital camera. Moreover, reverse telephoto lens systems advantageously address the telecentricity issue because of their inherent long back focal lengths and corresponding "soft" impingement angles.

As mentioned above, telecentric lens systems comprising an afocal zoom lens and a fixed positive rear element whose front focus falls at the aperture stop for all zoom positions generally have an excessive front vertex-to-image plane distance (FVIP) resulting in a long, bulky lens assembly. In addition, the FVIP and the baseline length (i.e., the absolute minimum length of the lens at all focal lengths) are, respectively, functions of the powers of the front and rear lens groups. Typically, in moving between the telephoto and wide angle positions, the front zooming group in these lens systems undergoes parabolic motion relative to the fixed rear group thus increasing the mechanical complexity of the camera. At the same time, rear lens group power is limited in order to ease aberration correction. Film based cameras that use a two-moving-group (positive, negative) lens system often create very large angles of impingement of the ray bundle on the image plane in wide angle mode and thus are undesirable for digital camera use.

Zoom lenses comprising a first divergent zooming lens unit and a second convergent zooming lens unit are known. The second lens unit of such zoom lenses typically comprises three or more positive power lens elements with at least one negative power lens element sandwiched between two of these positive power lens elements (i.e., plus, minus, plus configuration). Such zoom lenses are described in U.S. Pat. Nos. 4,155,629; 4,299,452; 5,552,937 and 5,563,739. U.S. Pat. Nos. 4,999,007 discloses a zoom lens having a first divergent zooming lens unit and a second convergent zooming lens unit. The second lens unit of this zoom lens has an overall positive power but contains only one positive power lens element and two negative power lens elements. Thus the positive power lens element has to be very strong. This feature, in turn, is a source for optical aberrations and affects the overall image quality.

Accordingly, the inventor has recognized a need for a less costly, less mechanically and optically complex, and more compact zoom lens suitable for use particularly in a compact digital camera, which provides excellent image quality, which is environmentally stable, and which addresses the problems identified above.

SUMMARY OF THE INVENTION

The invention is generally directed to a reverse telephoto zoom lens and more particularly to such a zoom lens delivering near telecentric performance that is especially suitable for use in a compact digital camera.

According to an embodiment of the invention, a zoom lens comprises a first lens group that includes a first lens component which is positioned closer to an object than any other lens component of the zoom lens, and a second lens group that includes a last lens component which is positioned closer to an image plane than any other lens component of the zoom lens, wherein said last lens component has a concave surface facing the image plane. In an aspect of this embodiment, the first lens group has overall negative power and the second lens group has overall positive optical power. In another aspect, the last lens has a convex surface opposite the concave surface. In a further aspect of this embodiment, the first lens group includes a lens having both positive and negative power in respective radial zones of the lens. In another aspect, the second lens group includes a biconvex lens adjacent the last lens.

In another embodiment, a zoom lens, comprises a first lens group including a first lens component positioned closer to an object than any other lens component, and a second lens group including a last lens component positioned closer to an image plane than any other lens component, wherein the first lens group includes a lens component having both positive and negative power in respective radial zones of the lens. In an aspect of this embodiment, the last lens has a concave surface facing the image plane.

According to another embodiment of the invention, a zoom lens comprises, in order from an object side, a first zooming lens unit having divergent optical power and a second zooming lens unit having convergent optical power (i.e., a negative, positive lens system). The first zooming lens unit includes a first, negative power lens element, a second lens element, and a third, positive power lens element. At least one of these lens elements has an aspherical surface. The second zooming lens unit includes, in order, a fourth, positive power lens element, a fifth, positive power lens element and a sixth, negative power lens element having a concave surface towards an image forming side of the system. Zooming is performed by changing a distance between the first lens unit and the second lens unit.

The above, and other objects, advantages and novel features of the present invention will become more apparent from the accompanying detailed description thereof when considered in conjunction with the following drawings.

DETAILED DESCRIPTION OF THE INVENTION

The invention is generally directed to a reverse telephoto, two lens-group zoom lens system and preferably to a zoom lens that provides near telecentric performance which is especially suitable for use in a compact digital camera.

The present description will be directed in particular to elements forming part of, or in cooperation more directly with, the apparatus in accordance with the present invention. It is understood that elements not specifically shown or described may take various forms well known to those skilled in the art.

Figure 1:
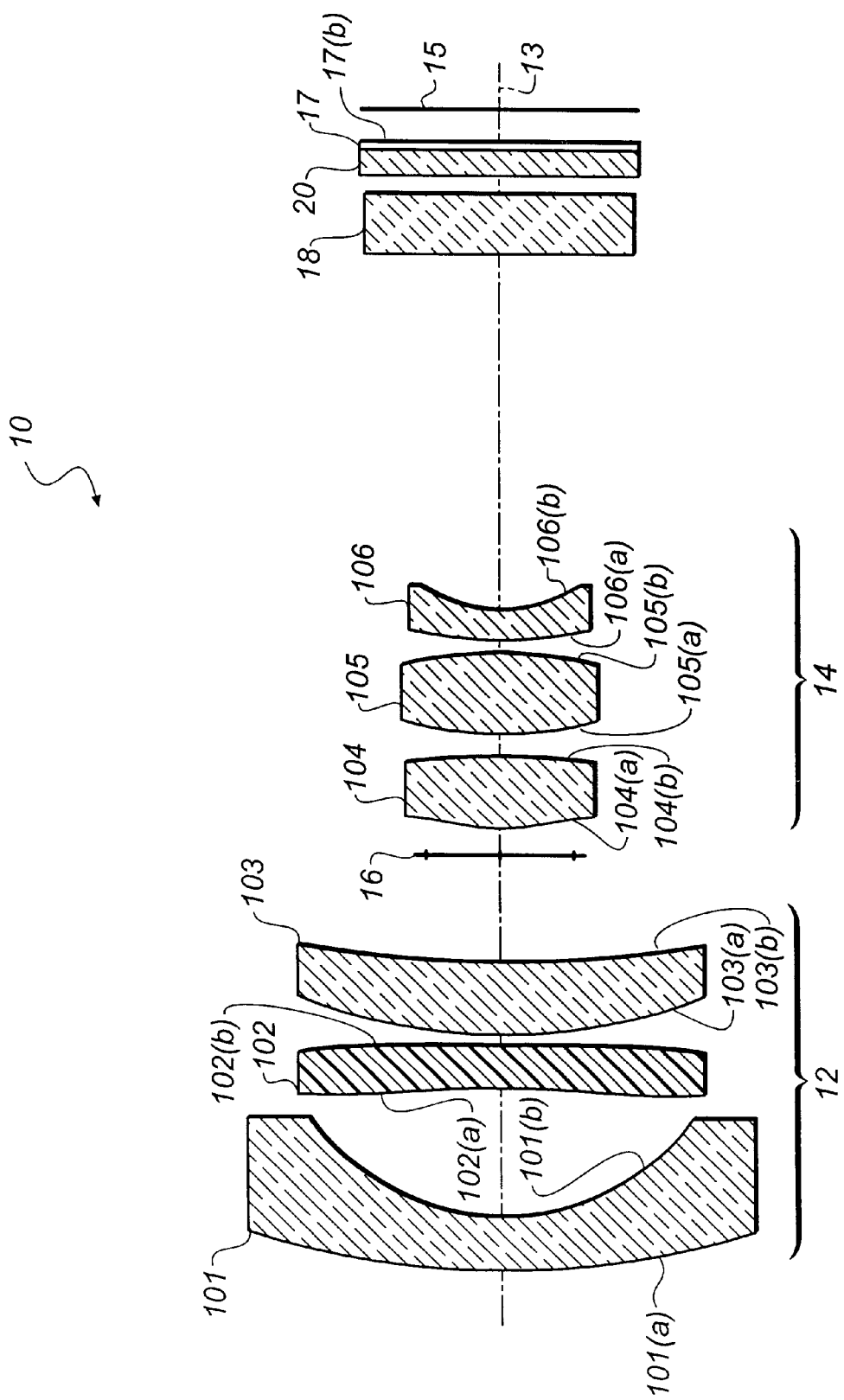
FIG. 1 shows a sectional view of a zoom lens in a telephoto position according to an embodiment of the invention.
Figure 2:
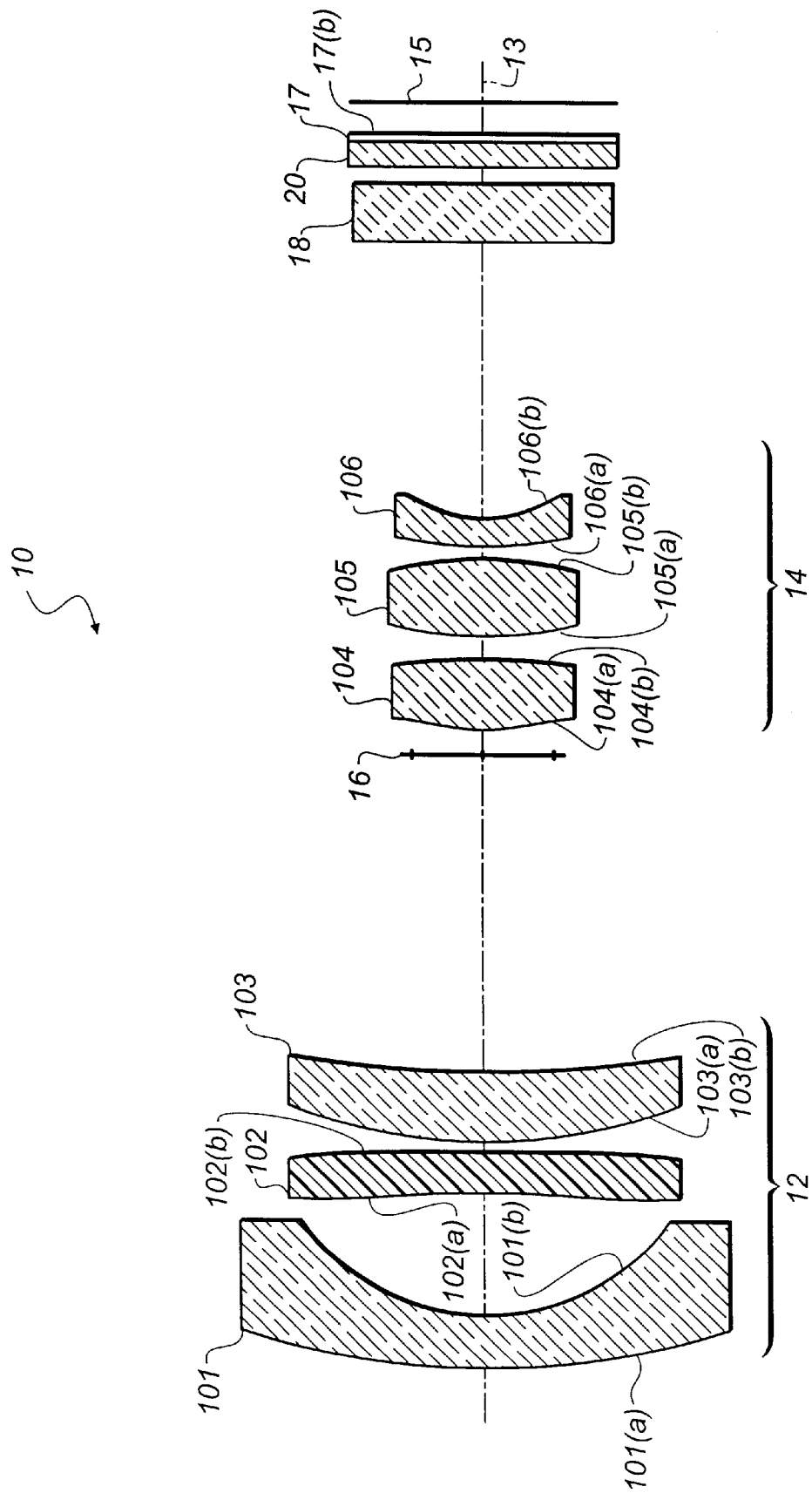
FIG. 2 shows a sectional view of the zoom lens in a mid-zoom position.
Figure 3:
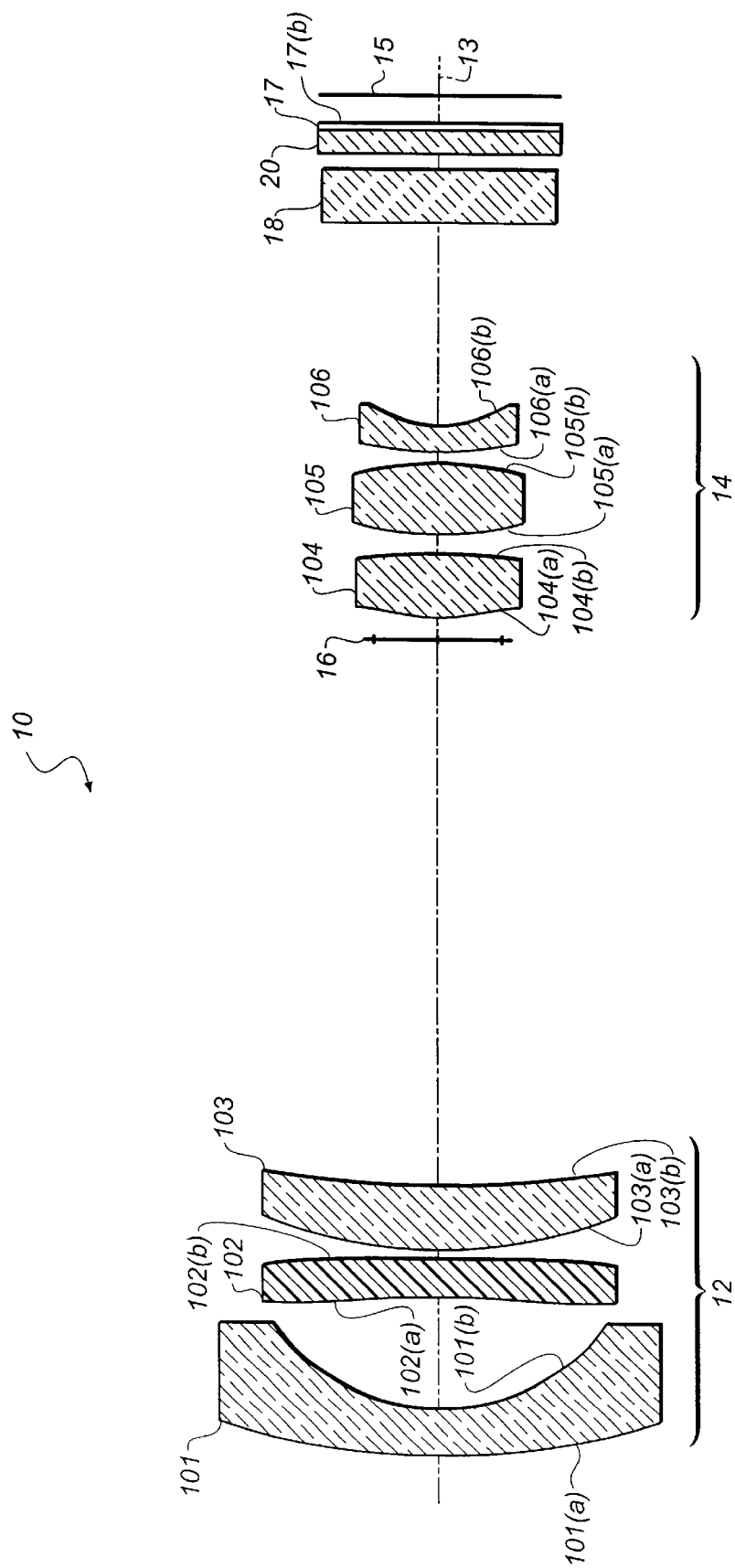
FIG. 3 shows a sectional view of the zoom lens in a wide angle position.

FIGS. 1 through 3 respectively illustrate a preferred zoom lens 10 in a telephoto, mid-focus, and wide angle position. The zoom lens 10 includes a front lens group 12 and a rear lens group 14, respectively disposed for movement along the optical axis 13. During zooming, the two lens groups 12, 14 move along the optical axis 13 relative to one another. Preferably, the motion of both lens groups is non-reversing in going from the telephoto position to the wide angle position and vice-versa once the zoom unit is moved out of a parked position in a camera assembly.

Figure 4:
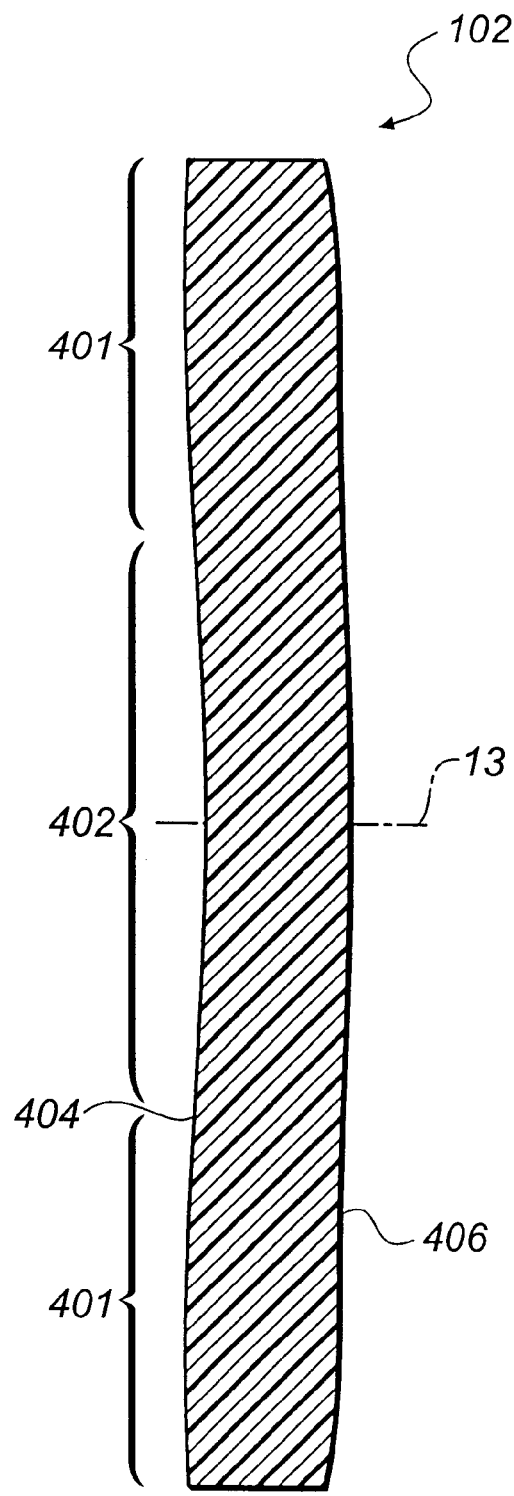
FIG. 4 shows a lens element of the zoom lens of FIGS. 1–3 which has positive and negative power.

An exemplary embodiment of a zoom lens 10 includes a front, negative power lens group 12 and a rear positive power lens group 14. The zoom lens preferably provides a 2× zoom ratio, however higher zoom ratios are possible as a person skilled in the art will appreciate. The front lens group 12 includes three lens elements 101, 102, 103. Each lens surface will be denoted in order from left to right as (a) and (b), thus lens element 101 has lens surfaces 101a and 101b. The first (object facing) lens element 101 is a negative power meniscus having a convex surface 101a facing the object side and a concave surface 101b that faces the image plane 15. The second lens element 102 is shown schematically in FIG. 4. It is a lens element having both positive and negative power over different zonal regions of the lens. More specifically, lens element 102 is an asphere having positive refractive power in a marginal zone 401 (i.e., at or near the clear aperture edge) and negative optical power in a central zone 402 centered about the center of the lens. The marginal zone 401 is the area of the lens element 102 herein defined by the radius r, such that $(0.722D/2) \leq r \leq D/2$, where D is the clear aperture diameter of the lens element 102. The negative optical power of the central zone 402 of the lens element is defined by the vertex radii of curvature of the front and back surfaces. Lens element 102 is thus a biaspheric lens element; i.e., it has two aspheric surfaces 102a, 102b. Lens element 102 provides weak refractive power both in the central zone and in the marginal zone such that $|\phi_2| < 0.1\ \phi_w$, where $\phi^w$ is the power of the zoom lens 10 at the wide angle position and $\phi_2$ is the power of the second lens element 102. The power $\phi_2$ is either measured in the marginal zone or is defined by the vertex radii of curvature and, thus, has two powers depending upon the measurement zone of the lens. The shape and power distribution of this lens element greatly improves aberration control of the zoom lens 10 and therefore enhances the performance of the zoom lens system. Lens element 102 is preferably molded from a plastic material and more preferably is athermalized. As referred to herein, the attribute of being athermalized refers to the lens having a long focal length or, in other words, weak optical power such that camera performance does not substantially vary with temperature change during operation. The third lens element 103 is a positive power lens element and has a high dispersion for correcting chromatic aberrations. It is preferred that the Abbe V-number of the third lens element 103 be less than 30. The first and the third lens elements 101, 103 preferably are made of glass. It is preferred that the index of refraction of lens elements 101, 103 be greater than 1.75.

The rear lens group 14 includes an aperture stop 16 as shown in FIGS. 1–3 and three lens elements 104, 105, 106. The lens elements 104, 105, 106 are arranged in an atypical plus, plus, minus configuration. More particularly, lens elements 104 and 105 have positive power and lens element 106 has negative power. Lens elements 104, 105 are biconvex lens elements. Lens element 104 is biaspheric. Lens element 105 is symmetrical; that is, it has two identical surfaces 105a, 105b, providing cost and assembly advantages for the zoom lens 10. Lens element 105 has an index of refraction less than 1.6 and low dispersion (Abbe V-number >50). The rear lens element 106 is a negative power meniscus lens element having a convex front surface 106a (object side surface) and a concave rear surface 106b (image side surface). The sixth lens element 106 preferably has an index of refraction greater than 1.75 and an Abbe V-number less than 30 to provide high dispersion. This distribution of indices and V-numbers helps to provide good quality images with only a few lens elements.

Figure 5A:
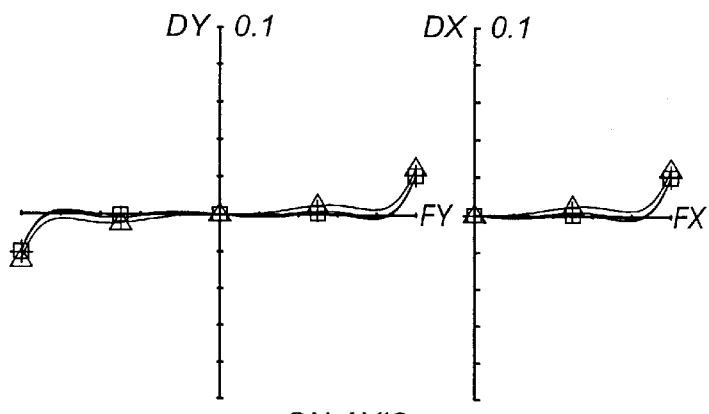
FIGS. 5A–5C are graphical representations of the aberrations of the zoom lens of FIG. 1 (telephoto position) at various field zones.
Figure 5B:
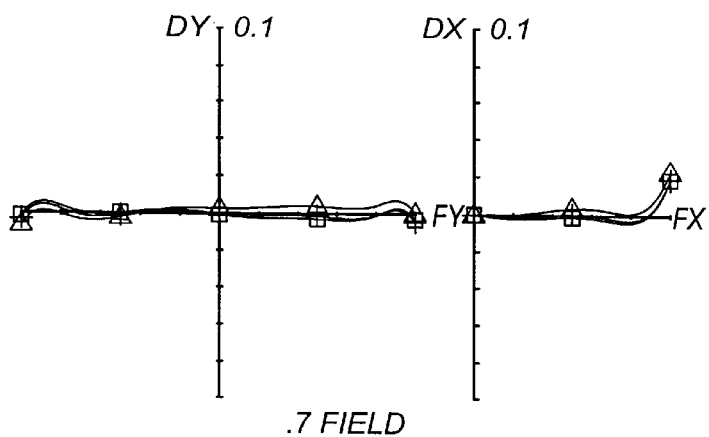
Figure 5C:
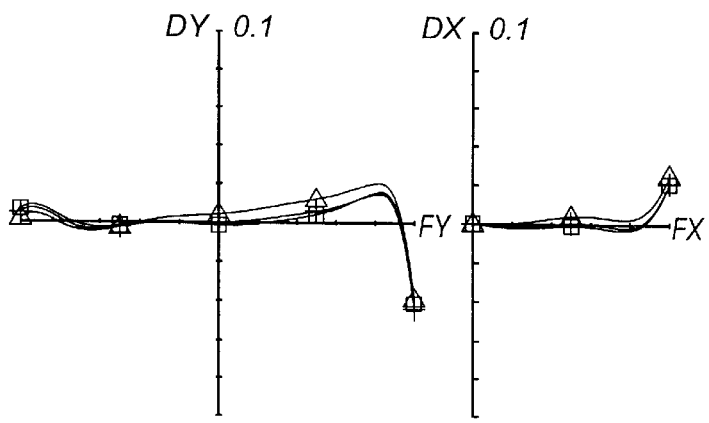
Figure 6A:
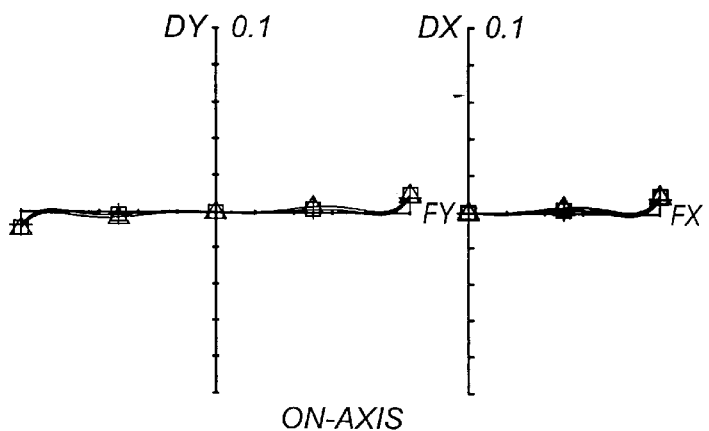
FIGS. 6A–6C are graphical representations of the aberrations of the zoom lens of FIG. 2 (mid-zoom position) at various field zones.
Figure 6B:
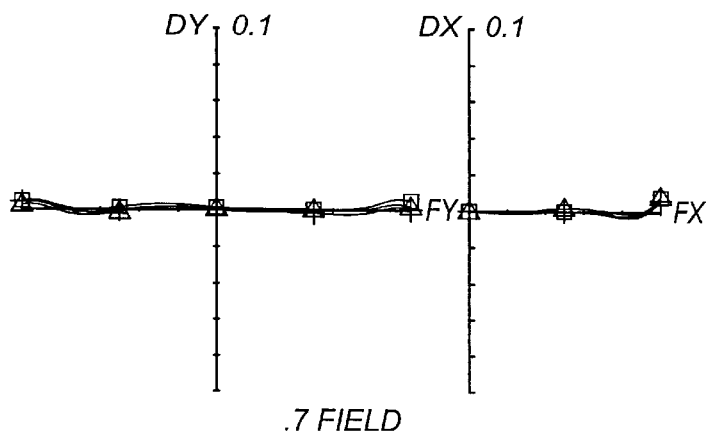
Figure 6C:
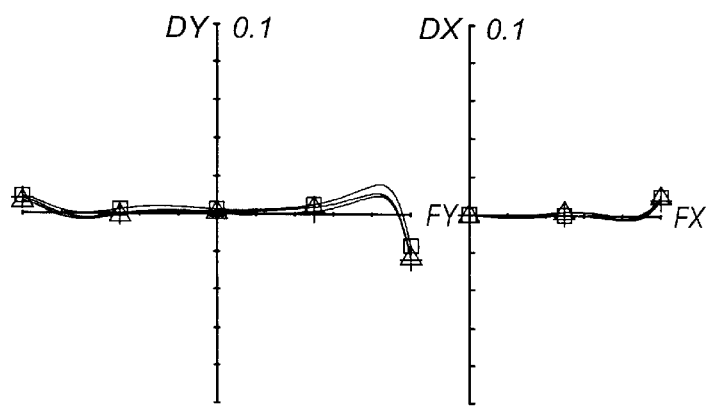
Figure 7A:
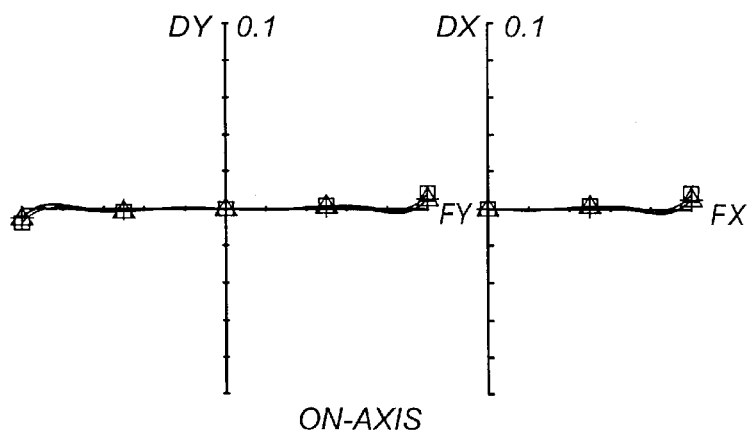
FIGS. 7A–7C are graphical representations of the aberrations of the zoom lens of FIG. 3 (wide angle position) at various field zones.
Figure 7B:
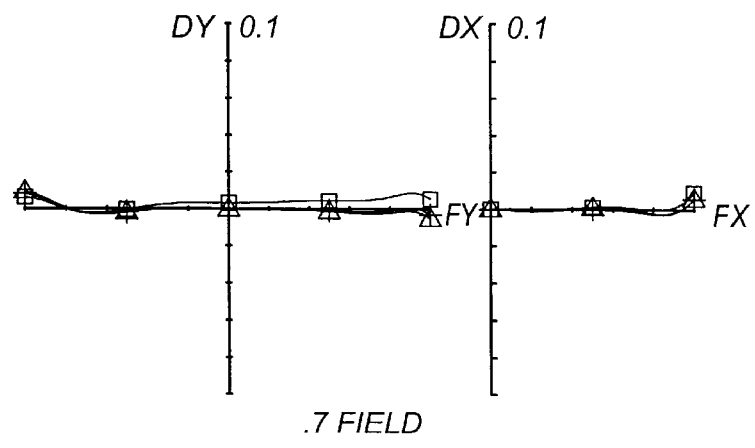
Figure 7C:
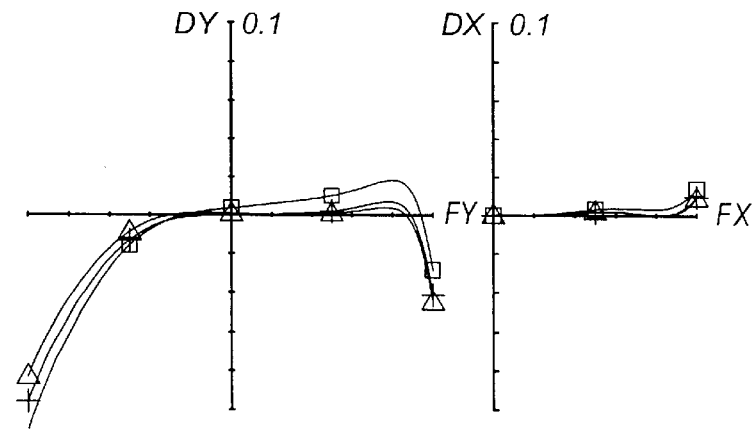
Figure 8A:
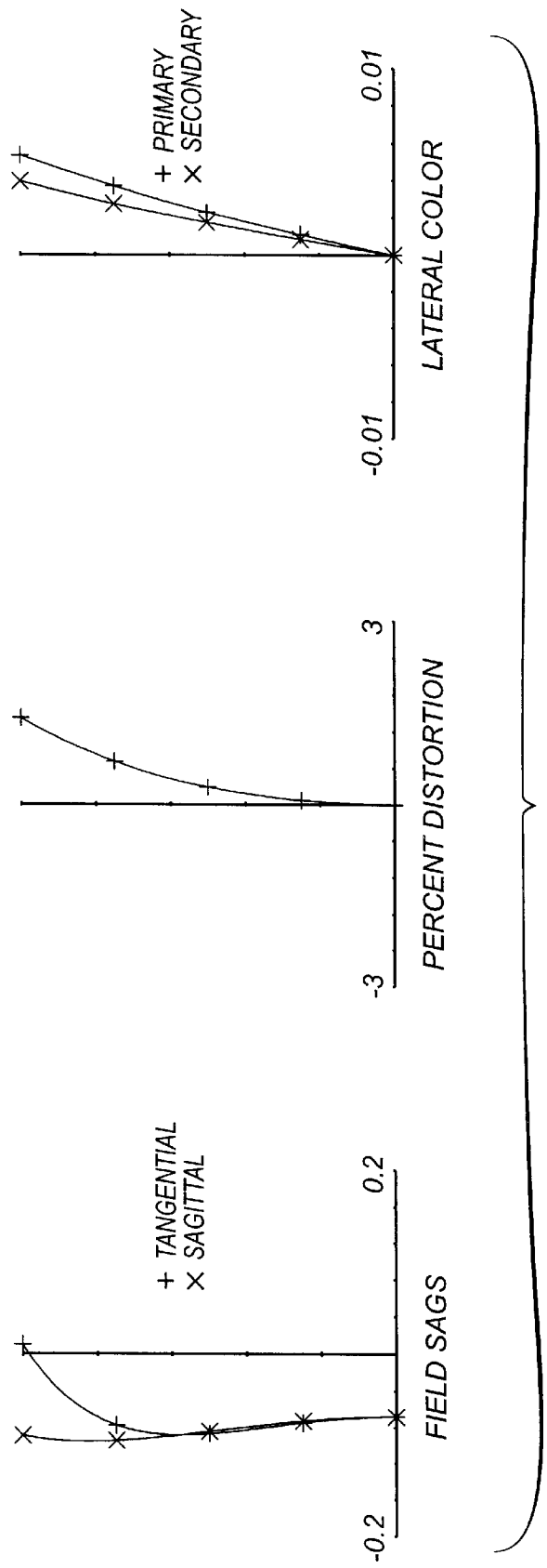
FIGS. 8A–8C are graphical representations of the distortion, astigmatism, and lateral color at the telephoto, mid-zoom, and wide angle positions of the zoom lens shown in FIGS. 1–3, respectively.
Figure 8B:
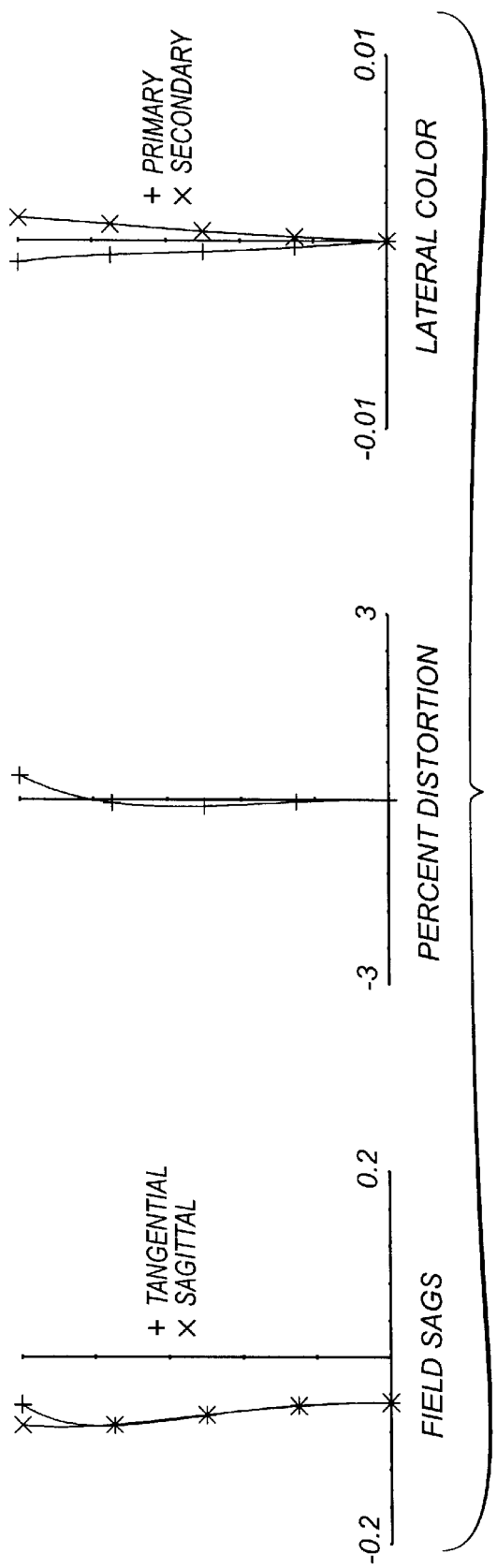
Figure 8C:
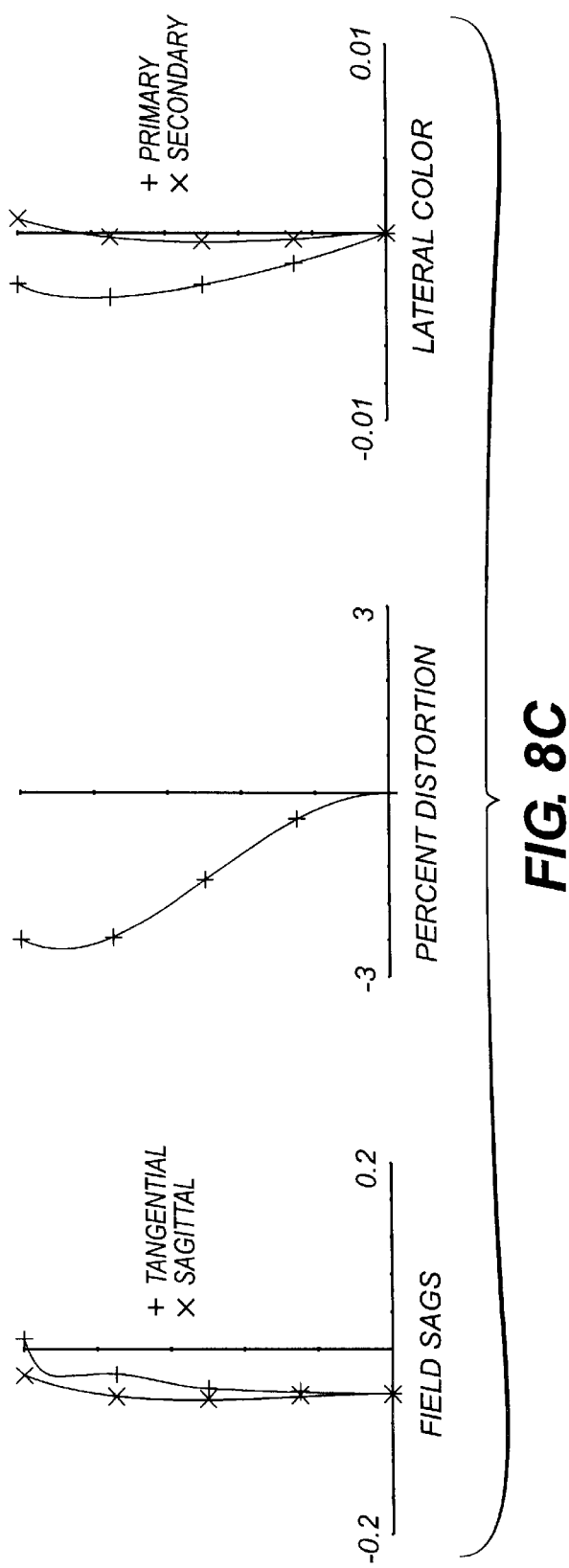
Figure 9A:
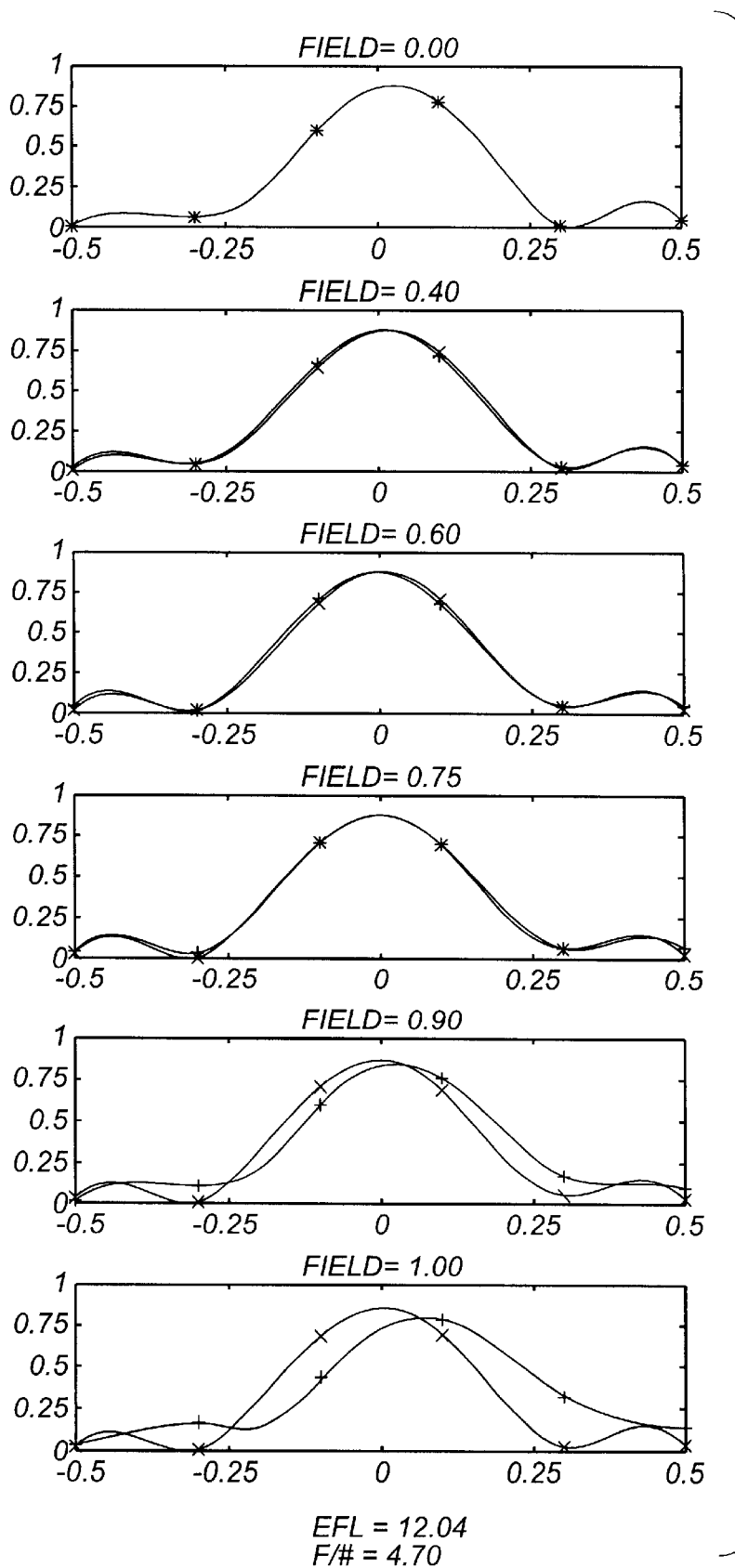
FIGS. 9A–9C are MTF plots at various field zones of the zoom lens in the telephoto, mid-zoom, and wide angle positions, respectively.
Figure 9B:
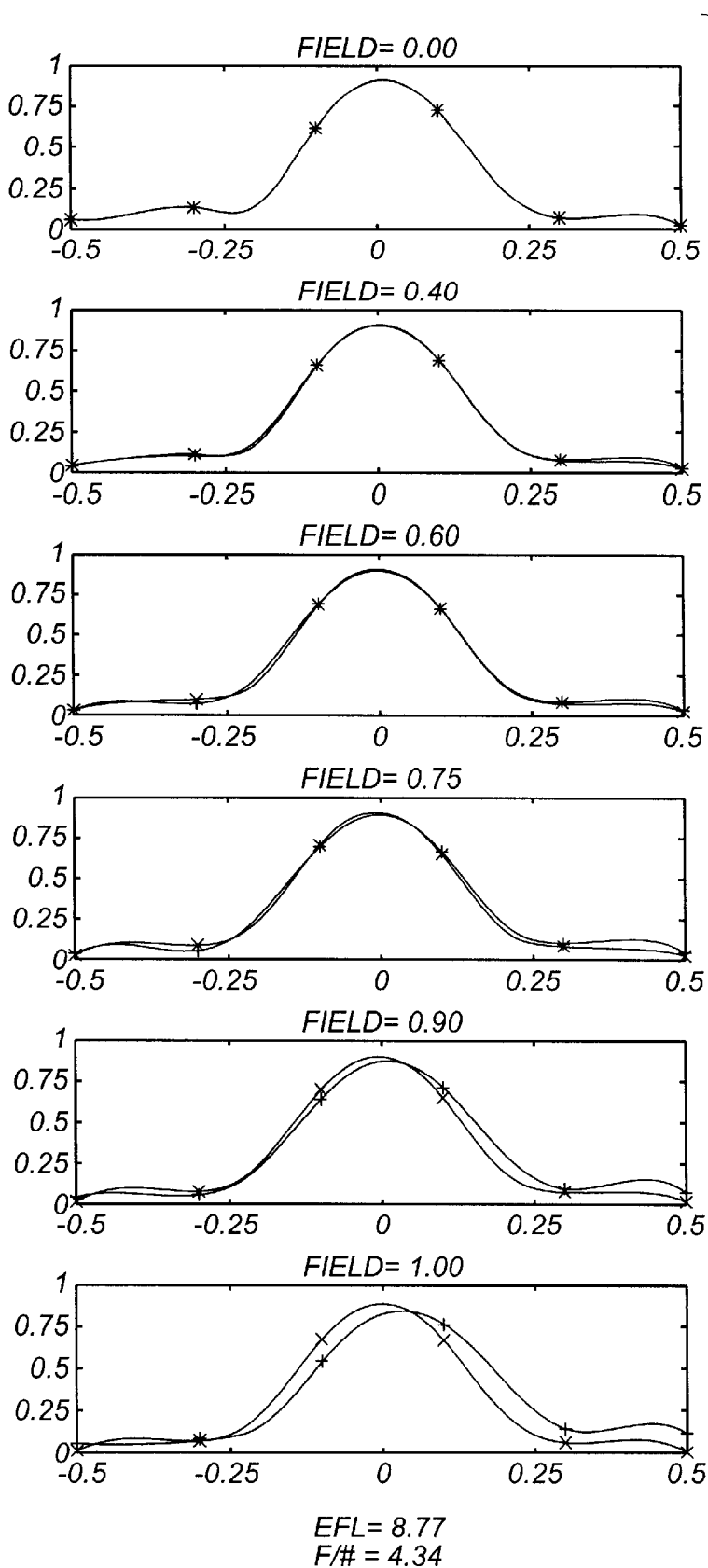
Figure 9C:
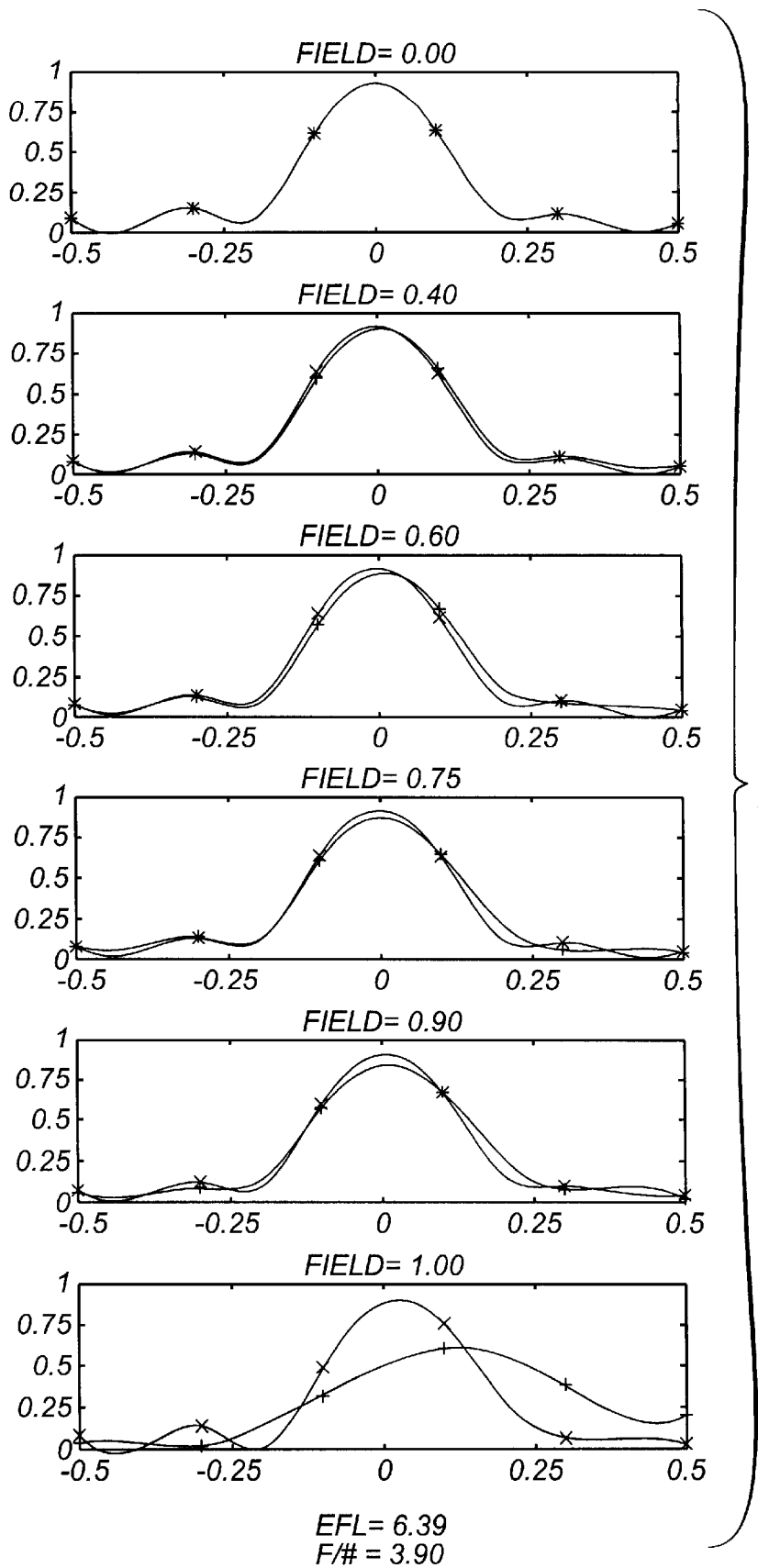

Zoom lens 10 provides a high quality image on an image plane 15 located adjacent a rear surface 17b of a photosensitive electronic sensor 17, for example, a CCD array. Two plane parallel plates 18, 20, each having zero refractive power, are located behind (i.e., on the image plane side) the zoom lens 10 and in front of the sensor 17. The plate 18 preferably is a quartz plate and serves as an antialiasing filter. Zoom lens 10 exhibits high MTF (modulation transfer function) values. FIGS. 9A–9C illustrate the MTF performance at 54 cycles/mm of the exemplary zoom lens 10 at various field values for the wide angle, mid-focus, and telephoto positions, respectively. The quartz plate 18 reduces the MTF values for frequencies that are higher than the Nyquist frequency of the sensor 17. For any given sensor, the Nyquist frequency (measured in cycles/mm) is defined as N=1/2 P where P is the pixel pitch of the sensor. The plate 20 is a cover glass for the sensor 17. The performance of the zoom lens in conjunction with the plates 18 and 20 is illustrated in FIGS. 5A–5C, 6A–6C, 7A–7C, 8A–8C and 9A–9C. Included are ray traces for the various field positions, and field curvature and distortion plots for the telephoto (T), mid-zoom (M) and wide angle (W) positions. More specifically, FIGS. 5A–5C provide ray intercept plots for the zoom lens 10 when it is operating at the telephoto position at 0, 0.7 and full field of view, respectively. FIGS. 6A–6C provide ray intercept plots for the zoom lens 10 when it is operating at the telephoto position at 0, 0.7 and full field of view, respectively. FIGS. 7A–7C provide ray intercept plots for zoom lens 10 when the zoom lens is operating at the wide angle position. FIGS. 8A–8C illustrate astigmatism and distortion values when the zoom lens is operating at the telephoto position, mid-zoom position and wide angle position, respectively.

Exemplary numerical data for the zoom lens system is provided in Tables 1A–1D. In these tables $R_i$ stands for the vertex radius of curvature of the $i^{th}$ surface, $N_e$ stands for the index of refraction at the wavelength $\lambda_e$ of 546.1 nm, and $v$ stands for the Abbe V-number of the refractive material. The thicknesses of the lens elements and the spacings provided in the tables are in millimeters. The following values apply to the exemplary zoom lens system:
Effective focal length (EFL): 6.39 mm–12.04 mm,
Semi-field: 32.70 degrees–18.15 degrees,
F/#: 3.9–4.7

TABLE 1A

| Surface | Radius | Thickness (T) | $N_e$ | v |
|---|---|---|---|---|
| 101a | 22.936 | 1.5 | 1.801 | 35.0 |
| 101b | 6.509 | 3.558 | | |
| *102a | Asph | 1.2 | 1.59 | 30.9 |
| *102b | Asph | 0.3 | | |
| 103a | 14.962 | 2.028 | 1.847 | 23.8 |
| 103b | 34.445 | $S_2$ = Variable | | |
| Aperture Stop | | 0.7 | | |
| *104a | Asph | 2.008 | 1.517 | 64.2 |
| *104b | Asph | 0.657 | | |
| 105a | 10.122 | 2.237 | 1.517 | 64.2 |
| 105b | −10.122 | 0.372 | | |
| 106a | 11.318 | 0.8 | 1.847 | 23.8 |
| 106b | 3.902 | $S_5$ = Variable | | |
| plano | | 1.66 | 1.460 | 68.8 |
| plano | | 0.5 | | |
| plano | | 0.7 | 1.498 | 70.2 |
| plano | | | | |

| Wavelengths (μm) | | |
|---|---|---|
| $\lambda_1$ | $\lambda_2$ | $\lambda_3$ |
| 0.5461 | 0.4861 | 0.6563 |

*Asphere

TABLE 1B

Zoom Spacing Data

| Zoom Position # | A | B | BFL | EFL |
|---|---|---|---|---|
| 1 (wide) | 17.744 | 6.607 | 9.36 | 6.39 |
| 2 | 13.159 | 7.234 | 9.99 | 7.48 |

TABLE 1B-continued

Zoom Spacing Data

| Zoom Position # | A | B | BFL | EFL |
|---|---|---|---|---|
| 3 | 9.221 | 7.976 | 10.73 | 8.77 |
| 4 | 5.868 | 8.850 | 11.60 | 10.27 |
| 5 (tele) | 3.000 | 9.879 | 12.62 | 12.04 |

BFL is the back focus distance in the absence of plates 18, 20 and EFL is the focal length of the zoom lens 10.

TABLE 1C

Aperture Stop Diameter

| Zoom Position # | Diameter |
|---|---|
| 1 (wide) | 3.88 |
| 2 | 3.88 |
| 3 | 3.88 |
| 4 | 3.88 |
| 5 (telephoto) | 4.05 |

Zoom lens 10 has four aspheric surfaces 102a, 102b, 104a, 104b. The aspheric equation describing these aspheric surfaces is:

$$X = \frac{CY^2}{1 + \sqrt{1 - (k+1)C^2Y^2}} + ADY^4 + AEY^6 + AFY^8 + AGY^{10}$$

where:
X is the distance along the optical axis OA;
Y is the height from the optical axis;
C is the reciprocal of the vertex radius of curvature of the curved lens surface;
k is the conic constant; and
AD through AG are aspheric coefficients of 4th, 6th, 8th, and 10th order.

The values of the aspheric coefficients for the various aspheric lens surfaces for this lens embodiment are provided in Table 1D.

TABLE 1D

| SURF.3 | C = −.0401524 | D = .5285504E-03 | F = .1138240E-06 |
|---|---|---|---|
| | K = .0000000 | E = −.2563260E-06 | G = −.4252920E-08 |
| SURF.4 | C = −.0217244 | D = .3424730E-03 | F = .1433360E-06 |
| | K = .0000000 | E = −.3617580E-05 | G = −.7587230E-08 |
| SURF.7 | C = .1155535 | D = −.1063610E-02 | F = .7952570E-05 |
| | K = .0000000 | E = .1598850E-04 | G = −.2043640E-05 |
| SURF.8 | C = −.0494805 | D = .3645190E-03 | F = .3821190E-04 |
| | K = .0000000 | E = −.1320710E-03 | G = −.3804370E-05 |

The zoom lens according to the invention provides all of the advantages described above and, particularly, delivers near telecentric performance combined with mechanical simplicity.

The invention has been described in detail with particular reference to preferred embodiments thereof, but it will be understood that variations and modifications can be effected within the spirit and scope of the invention as described hereinabove as defined in the appended claims.

What is claimed is:

1. A zoom lens comprising, in order from an object side:
a first zooming lens unit having divergent optical power, said first zooming lens unit consisting of a first, negative power lens element, a second lens element, and a third, positive power lens element, at least one of said lens elements having an aspherical surface; and a second zooming lens unit having convergent optical power, said second zooming lens unit includes, in order, a fourth, positive power lens element, a fifth, positive power lens element and a sixth, negative power lens element concave towards an image side, wherein zooming is performed by changing a distance between said first lens unit and said second lens unit and said zoom lens satisfies the following condition: $|\phi_2|/\phi_w<0.1$, where $\phi_2$ is a power of said second lens element and a $\phi_w$ is a power of said zoom lens in a wide angle position.

2. A zoom lens according to claim 1, wherein said second lens element is plastic and has at least one aspherical surface.

3. A zoom lens according to claim 2, wherein said second lens element is defined by its vertex radii of curvature as a meniscus lens element.

4. A zoom lens according to claim 1, wherein said second lens element is plastic a and has at least one aspherical surface.

5. A zoom lens according to claim 4, wherein said second lens element is defined by its vertex radii of curvature as a meniscus lens element.

6. A zoom lens according to claim 4, wherein said fourth and said fifth lens elements are biconvex and said second lens element is defined by its vertex radii of curvature as a meniscus lens element.

7. A zoom lens according to claim 1, wherein one of said lens elements has both positive and negative power, further wherein said lens element has a refractive optical power of one sign in a marginal zone and a refractive optical power of an opposing sign in a central zone.

8. A zoom lens according to claim 7, wherein said lens element having a positive and negative power is a plastic lens element.

9. A zoom lens according to claim 1, wherein one of said lens elements has both a positive and a negative power, said positive/negative lens element having the positive refractive power in a marginal zone and the negative refractive power in a central zone.

10. A zoom lens according to claim 9, wherein said lens element having the positive and negative power is a plastic lens element.

11. A zoom lens according to claim 10, wherein said lens clement having the positive and negative power is said second lens element.

12. A zoom lens according to claim 10, wherein said fourth and said fifth lens elements are biconvex and said sixth lens element is a meniscus lens element.

13. A zoom lens comprising, in order from an object side:

a first zooming lens unit having divergent optical power, said first zooming lens unit consisting of a first, negative power lens element, a second lens element, and a third, positive power lens element, at least one of said lens elements having an aspherical surface; and a second zooming lens unit having convergent optical power, said second zooming lens unit includes, in order, a fourth, positive power lens element, a fifth, positive power lens element and a sixth, negative power lens element concave towards an image side, wherein said fourth and fifth lens elements are biconvex and said sixth lens element is a meniscus lens element and zooming is performed by changing a distance between said first lens unit and said second lens unit.

14. A zoom lens according to claim 13, wherein said second lens element is a meniscus lens element.

15. A zoom lens, comprising:

a first lens group including a first lens being closest to an object; and a second lens group including a last lens being closest to an image plane, wherein said first lens group includes a lens having both positive and negative power and said zoom lens satisfies the following condition: $|\phi|/\phi_w<0.1$, where $\phi$ is a power of said lens having both positive and negative power and a $\phi_w$ is a power of said zoom lens in a wide angle position.

16. The zoom lens of claim 15, wherein said last lens has a concave surface closest to the image plane.

17. A zoom lens, comprising:

a first lens group including a first lens being closest to an object; and a second lens group including a last lens being closest to an image plane, wherein said first lens group includes an aspheric lens element and said zoom lens satisfies the following condition: $|\phi|/\phi_w<0.1$, where $\phi$ is a power of said aspheric lens element and a $\phi_w$ is a power of said zoom lens in a wide angle position.

18. The zoom lens of claim 17, wherein said last lens has a concave surface closest to the image plane.

* * * * *